Nov. 7, 1933.  H. D. AUSTIN  1,934,251
RESILIENT FILTER
Filed Sept. 12, 1932
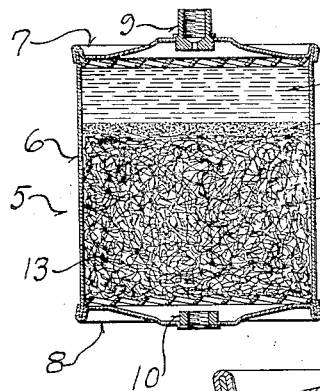
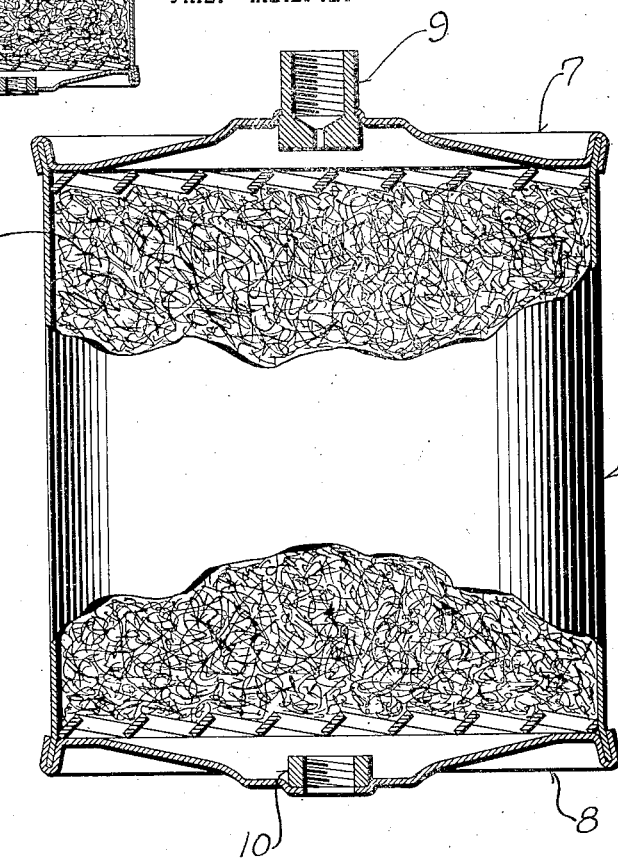
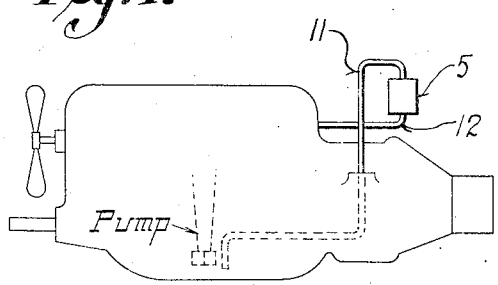
Inventor
Harvey D. Austin Patented Nov. 7, 1933

1,934,251

UNITED STATES PATENT OFFICE 1,934,251

RESILIENT FILTER

Harvey D. Austin, Lakewood, Ohio, assignor, by mesne assignments, to Briggs & Stratton Corporation, Milwaukee, Wis., a corporation of Delaware Application September 12, 1932
Serial No. 632,718

5 Claims. (Cl. 210—131)

This invention relates to certain new and useful improvements in filters and refers more particularly to oil filters for use with internal combustion engines of automotive vehicles.

It is a general object of this invention to provide a filter device of the character described which has a longer period of usefulness than like devices heretofore available and at the same time costs less to manufacture.

This object is attained by a construction of heretofore unprecedented simplicity. The increased effective life of the device is the result of agitating or internally moving the filter medium per se, so that the collected dirt is loosened and substantially inhibited from accumulating on any small area of the filter medium; and the economy of cost is obtained by selecting a filtering medium which has an inherent resilience to promote and enable continued successive compression and expansion to produce the desired internal motion of the filtering medium.

The value of loosening the collected dirt from its place of accumulation on the filter medium has been recognized in the past, but heretofore the necessary motion of the filter medium has been obtained only by the objectionable and costly use of springs and other means independent of but acting on the filter medium. This invention obviates all such additional equipment by utilizing material of inherent resilience as the filter medium.

Compression and expansion of the resilient filter medium is produced by the natural action of the device itself in response to the pressure of the oil being filtered, as will be more fully defined hereinafter.

It is therefore a more specific object of this invention to provide a receptacle containing a filter medium of a highly resilient nature, through which the lubricant to be cleaned is caused to flow under pressure.

With the above and other objects in view which will appear as the description proceeds, the invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawing, one complete example of the physical embodiment of this invention is illustrated constructed according to the best mode so far devised for the practical application of the principles thereof, and in which:

Figure 1 is a diagrammatic view showing an application of the filter of this invention to a conventional automobile engine;

Figure 2 is a view partly in side elevation and partly in section of the filter per se; and Figure 3 is a section view through the filter device at a reduced scale, illustrating the manner in which compression of the filter medium takes place.

Referring now more particularly to the accompanying drawing, in which like numerals designate like parts throughout the several views, the numeral 5 represents a container or receptacle of any conventional construction, preferably cylindrical, and consisting of a cylindrical shell 6 closed at its ends by a top 7 and a bottom 8. An inlet nipple 9 is carried by the top 7 and an outlet nipple 10 is carried by the bottom 8. The inlet and outlet nipples provide means for connecting the unit in the oiling system of automotive vehicle engines or the like as shown in Figure 1.

In the conventional installation depicted, the inlet 9 is connected through a pipe line 11 with the oiling system of the engine adjacent its oil pump, and the outlet 10 is connected with the system at any suitable point, through a pipe line 12, so that when the engine is in operation the lubricant will flow through the container or receptacle 5 under pressure.

The interior of the container or receptacle 5 is substantially filled with a suitable resilient fibrous material 13 so that the oil which enters the inlet nipple 9 must flow through the mass of fibrous material to reach the outlet 10. The resilient fibrous material which has been found to be best suited for the purpose is ordinary animal wool. This material is highly resilient and may be compressed to any suitable degree and any number of times without danger of losing resilience as by being submerged in oil no loss of its natural oil is possible.

If greater resilience than that of animal wool is desired, a quantity of conventional steel wool may be mixed with the animal wool. This material, being formed of innumerable coils of steel wire has an exceptionally great degree of permanent resiliency.

If desired, the animal wool may be supplanted by some other suitable fibrous substance such as cotton which when mixed with steel wool is given the desired resiliency to preclude its becoming packed and clogged.

Operation

With the filter device connected in the lubricating system of an engine as described and shown in Figure 1, the lubricant is caused to flow through the filter medium under pressure. As the lubricant flows through the filter medium, it deposits deleterious foreign particles carried thereby on top of the filter medium and as the operation continues, a layer of dirt is formed over the top of the filter medium.

This layer of dirt obviously retards the flow of lubricant and thus serves as a piston through which the pressure of the lubricant applied above the filter medium compresses the same as illustrated in Figure 3.

Laboratory tests have shown that the compression of the filter medium in response to the pressure of the lubricant is as high as 20%. As long as the engine is in operation, and the lubricant flowing through the filter device is under pressure, the filtering medium is retained in its compressed state, but upon cessation of the flow of lubricant as when the engine is stopped, the inherent resiliency of the filter medium causes it to expand to its normal condition. The compression and expansion of the filtering medium, although taking place gradually, is positive and produces the desired internal motion or agitation to loosen the collected dirt from its place of accumulation and cause it to seep down into the pores of the filter medium.

In this manner practically the entire mass of the filtering medium is made available for the collection of dirt and as the receptacle or container is substantially entirely filled with the filtering medium, it is apparent that an exceptionally long period of usefulness is obtained.

From the foregoing description taken in connection with the accompanying drawing, it will be readily apparent to those skilled in the art to which an invention of the character described appertains that this invention provides the filter device suitable for use with internal combustion engines which is extremely simple in construction involving no costly parts or materials, and one in which the inherent nature of the filtering medium cooperating with the natural state of the lubricant to be cleaned, effects a pressure of the lubricant to be cleaned, effects a desired agitation on the part of the filtering medium and thus prolongs considerably its period of usefulness.

What I claim as my invention is:

1. A device for cleaning lubricating oil and similar liquids comprising a receptacle through which the liquid flows, and a quantity of uncompacted animal wool having its fibers intimately intermingled to form numerous meshes extending therethrough with openings of minute fineness and depth, the wool being packed into the receptacle to strain deleterious foreign matter from the liquid as it flows through the receptacle.

2. In a filtering device of the character described, a container adapted to be connected in an oiling system and through which oil to be cleaned flows under pressure, a filtering medium comprising a mass of resilient animal wool, the fibers of which are intimately mixed and interconnected, and means maintaining the filtering medium under partial pressure at all times to cause the same to engage the walls of the container.

3. In a filtering device of the character described, a container adapted to be connected in an oiling system and through which oil to be cleaned flows under pressure, a filtering medium comprising a mass of inherently resilient animal fibrous material having the ability to extract foreign particles from lubricating oil and the like mixed with a quantity of steel wool and substantially filling the container, the fibers of the filtering medium and steel wool being interlocked in all directions.

4. In combination with an internal combustion engine having a pressure oiling system, a container interposed in the system and through which oil therein passes, a fibrous filtering medium substantially filling the container with its peripheral surface in constant engagement with the container side wall to strain deleterious foreign matter from the oil as it circulates through the system, said filtering medium having an inherent ability to compress and expand in response to fluctuation in the oil pressure to disturb foreign matter separated from oil passing through the system and accumulated on one end surface of the filtering medium and cause it to seep into the internal structure of the filtering medium.

5. A filter device for the lubricating system of an internal combustion engine in which lubricant is caused to flow under pressure when the engine is in operation, comprising a closed receptacle having an inlet and an outlet connectible with the lubricating system, and a mass of fibrous filtering material having its fibers loosely interlocked in all directions and under sufficient pressure at all times to substantially fill the receptacle and adapted to strain foreign particles from the lubricant as it flows through the receptacle, said foreign particles initially accumulating in a layer covering the fibrous filtering material adjacent the inlet to the receptacle so that the pressure of the lubricant acting on said layer tends to compress the fibrous filtering material, said fibrous filtering material having sufficient inherent resiliency to expand to its normal condition within the receptacle upon cessation of pressure with the system, whereby the mass of filtering material is agitated and the foreign particles accumulated on the surface of the mass of filtering material adjacent the inlet are caused to seep into the internal structure of the mass.

HARVEY D. AUSTIN.